US011676036B2

(12) United States Patent
Surya et al.

(10) Patent No.: US 11,676,036 B2
(45) Date of Patent: Jun. 13, 2023

(54) APPARATUS FOR KNOWLEDGE BASED EVOLUTIONARY LEARNING IN AI SYSTEMS

(71) Applicant: DIMAAG-AI, Inc., Fremont, CA (US)

(72) Inventors: Nagarjun Pogakula Surya, Bangalore (IN); Gomathi Sankar, Bangalore (IN); Fuk Ho Pius Ng, Portland, OR (US); Satish Padmanabhan, Sunnyvale, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 264 days.

(21) Appl. No.: 16/880,346

(22) Filed: May 21, 2020

(65) Prior Publication Data

US 2021/0365793 A1    Nov. 25, 2021

(51) Int. Cl.
*G06N 3/086* (2023.01)
*G06N 3/045* (2023.01)

(52) U.S. Cl.
CPC ............. *G06N 3/086* (2013.01); *G06N 3/045* (2023.01)

(58) Field of Classification Search
CPC ................................ G06N 3/045; G06N 3/086
See application file for complete search history.

(56) References Cited

U.S. PATENT DOCUMENTS

| 6,125,105 | A  | * | 9/2000  | Edwards   | ............. | H04Q 11/0478 370/255 |
| 2017/0177997 | A1 | * | 6/2017  | Karlinsky | .............. | G06V 10/82 |
| 2020/0097301 | A1 | * | 3/2020  | Pasala     | ....................... | G06N 3/08 |
| 2020/0286221 | A1 | * | 9/2020  | Hazan      | ................... | G06T 7/0012 |
| 2021/0125057 | A1 | * | 4/2021  | Choi       | ....................... | G06N 20/00 |
| 2021/0233300 | A1 | * | 7/2021  | Borer      | ...................... | G06T 13/40 |
| 2021/0407042 | A1 | * | 12/2021 | Berthelot  | .............. | G06T 3/4053 |

OTHER PUBLICATIONS

S. S. Sarwar, A. Ankit and K. Roy, "Incremental Learning in Deep Convolutional Neural Networks Using Partial Network Sharing," in IEEE Access, vol. 8, pp. 4615-4628, 2020, doi: 10.1109/ACCESS. 2019.2963056. (Year: 2020).*

* cited by examiner

*Primary Examiner* — Eric T Oberly
(74) *Attorney, Agent, or Firm* — Polygon IP, LLP (57) ABSTRACT

Systems and methods are disclosed for training a previously trained neural network with incremental dataset. Original train data is provided to a neural network and the neural network is trained based on the plurality of classes in the sets of training data and/or testing data. The connected representation and the weights of the neural network is the model of the neural network. The trained model is to be updated for an incremental train data. The embodiments provide a process by which the trained model is updated for the incremental train data. This process creates a ground truth for the original training data and trains on the combined set of original train data and the incremental train data. The incremental training is tested on a test data to conclude the training and to generate the incremental trained model, minimizing the knowledge learned with the original data. Thus, the results remain consistent with the original model trained by the original dataset except the incremental train data.

20 Claims, 7 Drawing Sheets

FIG. 1 - Training a Neural Network

FIG. 2 - Computing Ground Truth for Original Data

FIG. 3 - Incremental Training a Neural Network

FIG. 4 - Learning Without Forgetting

FIG. 5(a) 2D illustration of classes in an AI model

FIG. 5(b) 2D illustration of classes in retraining an AI model

FIG. 5(c) 2D illustration of classes in the incremental training

Class boundaries of an AI model

FIG. 6 - System environment of a computer system

FIG. 7 - Schematic embodiment of a computer System

APPARATUS FOR KNOWLEDGE BASED EVOLUTIONARY LEARNING IN AI SYSTEMS

BACKGROUND

Neural networks are a subclass of Artificial Intelligence based systems. The system takes a training dataset. Each data point in the dataset is mapped into one of a defined set of classes. Such a mapping is initially done by an expert. The system is trained to learn the relationship between the given training dataset and its corresponding classification into the classes. The objective is to use the trained system to classify a new datapoint into one of the classes without the need for an expert. In a typical application, the initial set of data points taken as training dataset is not complete. When the trained model is used to classify new data points, the system fails for some data points. These data points are collected and added to the initial training dataset as incremental training dataset. The objective is to train the neural network for the combined dataset of initial training data and the incremental training data. Thus, it is with respect to these considerations and others that the invention has been made.

SUMMARY

In a first aspect, systems and methods are disclosed. The method includes
  training a neural network with first training data over a training period;
  applying the neural network to a task and generating predictions from live data;
  receiving incremental training data to update the trained neural network;
  generating a ground truth data by combining the incremental training data and the first training data;
  training the neural network using the ground truth data to generate an incrementally trained neural network, wherein a retraining period is less than the training period; and
  applying the incremental neural network to generate predictions from live data.

In a second aspect, systems and methods are disclosed for training a previously trained neural network with incremental dataset. Original train data is provided to a neural network and the neural network is trained based on the plurality of classes in the sets of training data and/or testing data. The connected representation and the weights of the neural network is the model of the neural network. The trained model is to be updated for an incremental train data. The embodiments provide a process by which the trained model is updated for the incremental train data. This process creates a ground truth for the original training data and trains on the combined set of original train data and the incremental train data. The incremental training is tested on a test data to conclude the training and to generate the incremental trained model, minimizing the knowledge learned with the original data. Thus, the results remain consistent with the original model trained by the original dataset except the incremental train data.

In a third aspect, a method for modifying an artificial intelligence (AI) model (using a computer that includes one or more hardware processors with processing memory and storage memory) includes providing incremental train data to a training AI model, wherein the training AI model was initialized to an original model which was previously trained based on an original data finding the original data classification probabilities, by classification of the original data using the original model; assigning the original data classification probabilities as the ground truth for the original data; manually classifying the incremental train data into the target classes and assigning that as the ground truth for the incremental train data; classifying the incremental and original data using the training AI model to predict the current classification probabilities; computing loss using a custom loss function, wherein the custom loss function takes the original data probabilities as the ground truth for the data points in original dataset, but takes the ground truth of incremental train data based on the manual classification by experts; and updating the training AI model based on the loss computed using the custom loss function. The revised model is consistent with the original model regarding the same test data except with respect to the incremental training data. The AI system can be of one or more of a neural network model, a deep learning neural network model, a convolutional neural network model, or a deep learning neural network model.

BRIEF DESCRIPTION OF THE DRAWINGS

Non-limiting and non-exhaustive embodiments of the present innovations are described with reference to the following drawings. In the drawings, like reference numerals refer to the like parts throughout the various figures unless otherwise specified. For a better understanding of the described innovations, reference will be made to the following descriptions of various embodiments, which is to be read in association with the accompanying drawings, wherein:

FIG. 5($a$) illustrates a display diagram depicting the 2D illustration of classes in an AI model with respect to the illustration of class boundaries of an AI model.

FIG. 5($b$) illustrates a display diagram depicting the 2D illustration of classes in retraining an AI model with respect to the illustration of class boundaries of an AI model.

FIG. 5($c$) illustrates a display diagram depicting the 2D illustration of classes in the incremental AI model with respect to the illustration of class boundaries of an AI model.

DETAILED DESCRIPTION OF THE EMBODIMENTS

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term "neural network" refers to classification models that take an input and provide an output as classification of the input into one of the several classes. This may require training with the input and the desired class of each input. The term "neural network" includes, but not limited to, deep neural networks, recurrent neural networks, convolutional neural networks, region convolutional neural networks, fast region convolutional neural networks, faster region convolutional neural networks.

As used herein the term "training dataset" refers to the data input to the neural network during its training. The training dataset includes, but not limited to, numbers, vectors, sensor data, raw images, pictures, and videos.

As used herein the term "original dataset" refers to the data that was used to train a neural network for which the training has been completed. The original dataset includes, but not limited to, numbers, vectors, sensor data, raw images, pictures, and videos.

As used herein the term "incremental training dataset" refers to the data that is considered to be used in training a neural network which was already trained with an original dataset. The incremental training dataset is subsequently used to train the said trained neural network. The incremental training dataset includes, but not limited to, numbers, vectors, sensor data, raw images, pictures, and videos.

As used herein the term "model", in the context of the neural networks, refers to the multidimensional arrays with graph representation of the neural network and the weights associated with graph representation thereof. The graph representation is based on a collection of connected units or nodes at various layers. The connection between such nodes are marked with a weight. The input travels from the first layer (input layer) to subsequent layers, in which the outcome of one layer is fed as input for the subsequent layer(s), and finally to the last layer (output layer).

As used herein the term "ground truth of a data point" refers to the classification of an input data into one of the possible classes of the input dataset. The ground truth specifies which class the input data point belongs to.

As used herein the term "custom loss function of a data point" refers to the output of a neural network for the given datapoint taken to be the modified ground truth, as against the ground truth of the said data point. The custom loss function specifies the current state of the classification of the data point by the model of a neural network. Instead of assuming the ground truth as the loss function, the current state of classification is assumed to be the modified ground truth.

Training a Neural Network

Figure 1:
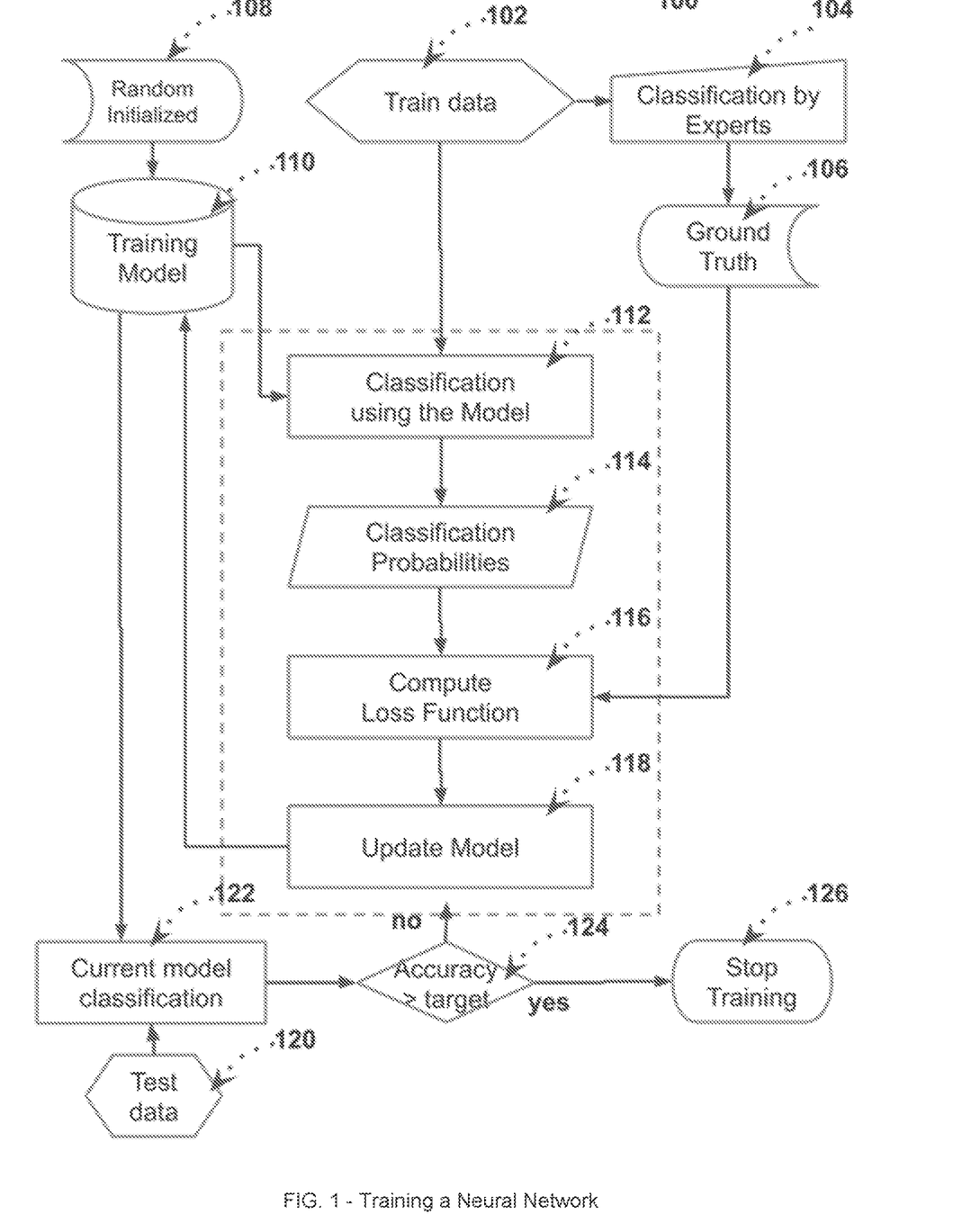
FIG. 1 illustrates a flow chart of a process for training a neural network

FIG. 1 describes training of neural networks for such a system.

Each of the data points in a training dataset 102 is classified by experts 104. Thus, each data point is associated with a class and that association is coded in a representation. This representation is called Ground Truth 108.

The artificial intelligence system or the neural network is defined by the training model 110. The training model is defined by a set of weights. When the training commences, the weights in the model are initialized to a set of random values 108.

The current training model 110 is used by the "classification using the model" 112, to predict "classification probablity" 114 for a data point. The classification probability of a data point is compared with the ground truth of that data point and a loss function is computed 116. The result of the loss function is used to update the model 118. A batch of data points is used in the steps 112, 114, and 116. At the end of that batch, the training model 110 is updated in step 118 for the entire batch.

The steps 112, 114, 116, and 118 are run iteratively to update the training model 110 for all data points in the train data 102 and also iteratively multiple times over the entire train data. One run or few runs across the entire dataset is an epoch.

At regular intervals between epochs or iterations, the training model 110 is used to compute the classification accuracy 122 of the test data 120. It is noted that the test data 120 is also classified by experts and a ground truth is associated with that. Using the ground truth associated with test data 120 and the current training model 110, classification accuracy of the current model 122 is computed. The accuracy is compared with target accuracy 124. If the current model accuracy is not greater than the target accuracy, then the training iterations are continued by steps 112, 114, 116, and 118. The training continues till the current model accuracy is greater than the target accuracy, and then the training is stopped 126.

Explaining the Classification by Neural Network

Figure 5A:
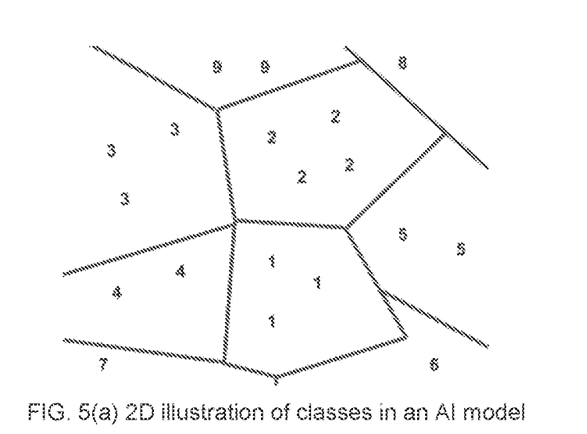

Such an artificial intelligence (AI) system can be described in the following manner. The dataset is visualized to be in an n-dimensional space. The training model 110 of the AI system partitions the n-dimensional space into subspaces with hyperplanes. For simplicity, a 2-dimensional space and the data points are shown in FIG. 5a. The points in that represent the data points in the training and test data points. The lines in that represent the partitions created by the AI model. When a new data point is input to this model, that data point falls in one of the partitions and the class of the partition is given as the output of the model.

Training of such AI systems are started with Random Initialized 108 values. If the system is created from scratch with different random values, the final training model 110 can be different.

Figure 5B:
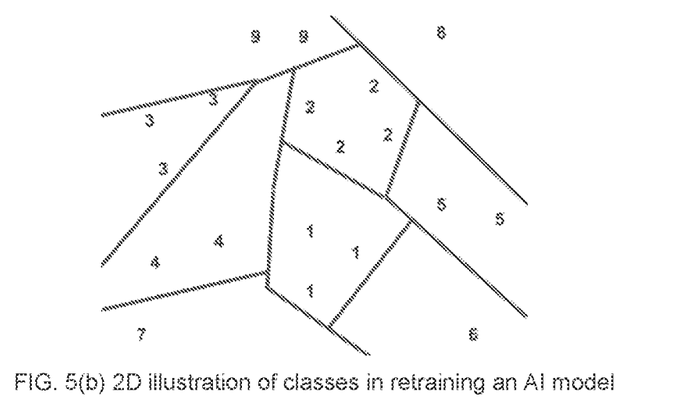

Such variation in the model is explained in FIG. 5b in comparison with FIG. 5a. For the given set of data points, the classification accuracy is achieved by both models represented by FIG. 5a and FIG. 5b, even though the models or the partitions look completely different.

Figure 5C:
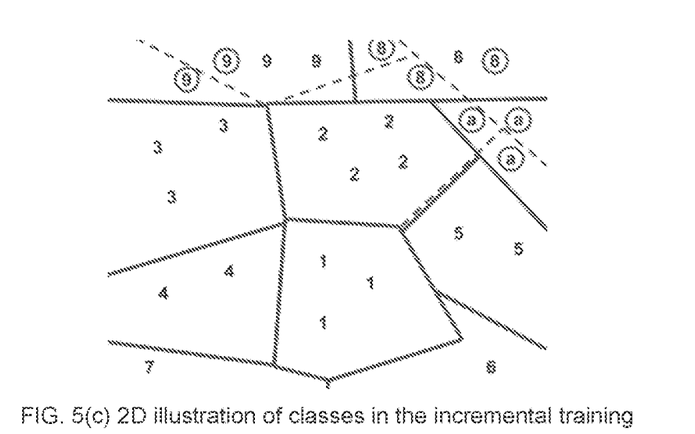

In a practical application of such AI systems, the historical data is used as the training and test data sets. This data set is called the original dataset. After the initial training, the trained AI system is used in real-time to classify the data points to the classes. In that, some of the data points may be misclassified. The reason for such misclassification is that the data points were not part of the chosen historical data or training data, which may be as unrepresented data. FIG. 5c Illustrates this with data points encircled. The classes given in FIG. 5a are shown in dotted lines in FIG. 5c. In that, one data point of class '9' is in the class 3. Similarly, two data points of class '8' are in class '9' and class '2'. A new class shown as data points 'a' is introduced. Some of these data points are unrepresented in the original dataset of FIG. 5a.

As a corrective measure for any revised system, this unrepresented data has to be used in the training of the model for the associated AI-System. There are multiple ways to approach this.

Training a Pre-Trained Model

First method is to retrain with the original training data plus the unrepresented data points. The whole process of training 100 is repeated on the combined data set of original data set and the unrepresented dataset. This will generate an entirely new training model 110. This process takes a long time and the results might vary due to the different partitions discussed in FIG. 5a and FIG. 5b. Thus, its result may be inconsistent with the unrevised model.

Figure 4:
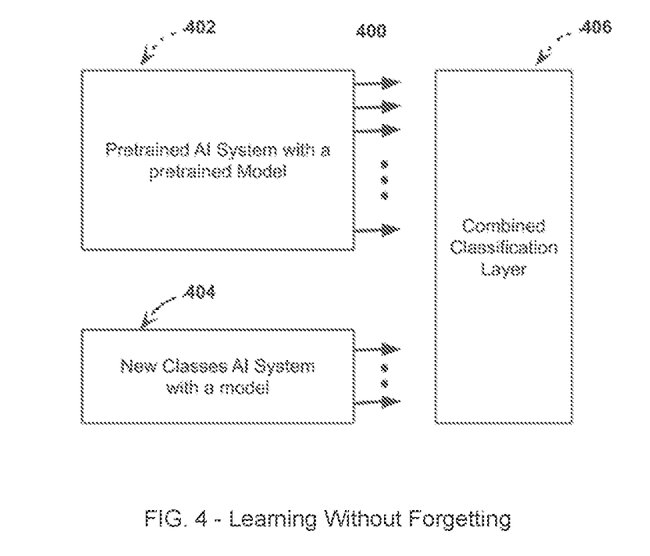
FIG. 4 illustrates a schematic embodiment of a process for learning without forgetting.

Second method is called learning without forgetting 400 as illustrated in FIG. 4. In this, the original AI system with an original model 402 is taken. A new classes AI system 404 with additional layers are added. The output of the two AI systems are handled by a combined classification layer 406. The training iterations are run on only on the new classes AI system 404 and combined classification layer 406. The training does not modify the original AI system 402. The new classes AI system 404 and combined classification layer 406 are used to learn any new classes introduced in the unrepresented data. This is useful in the scenario mentioned below. The original data set had n classes and a model was created for those n classes. Then the unrepresented data introduced additional k classes. The neural network model is augmented with more layers to learn the k classes.

There is a case, where unrepresented data introduces new data points that are at the boundaries of the classification and are wrongly classified. The requirement is to modify the model such that the wrongly classified data points are correctly classified. This requirement is detailed as the incremental training in the following.

Illustrative Operating Environment

Figure 6:
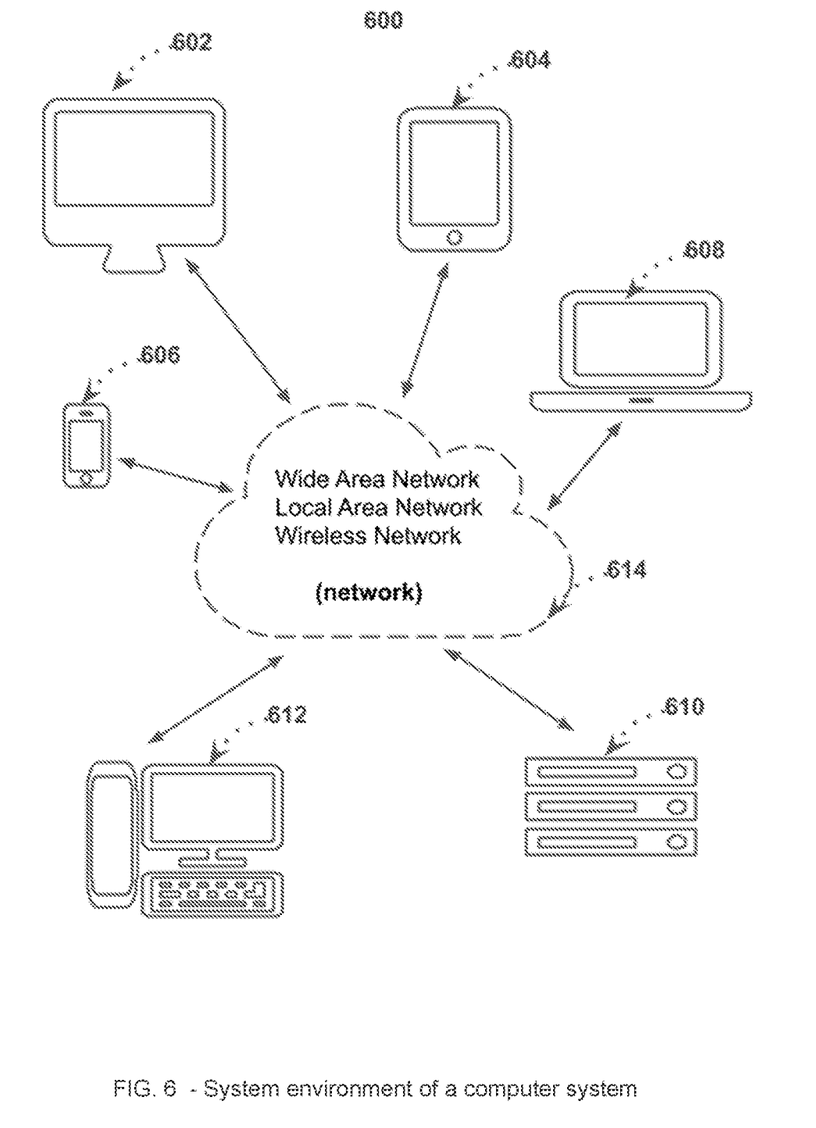
FIG. 6 illustrates a system environment of a computer system

FIG. 6 illustrates a system environment of a computer system. This shows components of one embodiment in which embodiments of the invention may be practiced. Not all of the components may be required to practice the invention, and variations in the arrangement and type of the components may be made without departing from the spirit and scope of the invention. As shown, the system 600 of FIG. 6 may include a network 614. The network 614 includes, but not limited to, wide area network, local area network, wireless networks, internet, cloud network, universal serial bus, other forms of computer readable media, or a combination thereof. The system 600 may not include a network 614.

The system 600 includes one or more of the computer systems. The computer systems include, but not limited to, a desktop computer 602, tablet computer 604, mobile phone computing system 606, laptop computer 608, server computer 610, and personal computer 612. Generally, computer system 602 to 612 may include virtually any computer capable of executing a computer program and performing computing operations or the likes. However, computer systems are not limited and may also include other computers such as telephones, pagers, personal digital assistants, handheld computers, wearable computers, integrated devices combining one or more of the preceding computers. The computer systems 602 to 612 may operate independently or, two or more computer systems may operate over a network 614. However, computer systems are not constrained to these environments and may also be employed in other environments in other embodiments. Such operating computer systems 602-612, may connect and communicate using a wired or wireless medium by network 614.

Illustrative Computer System

Figure 7:
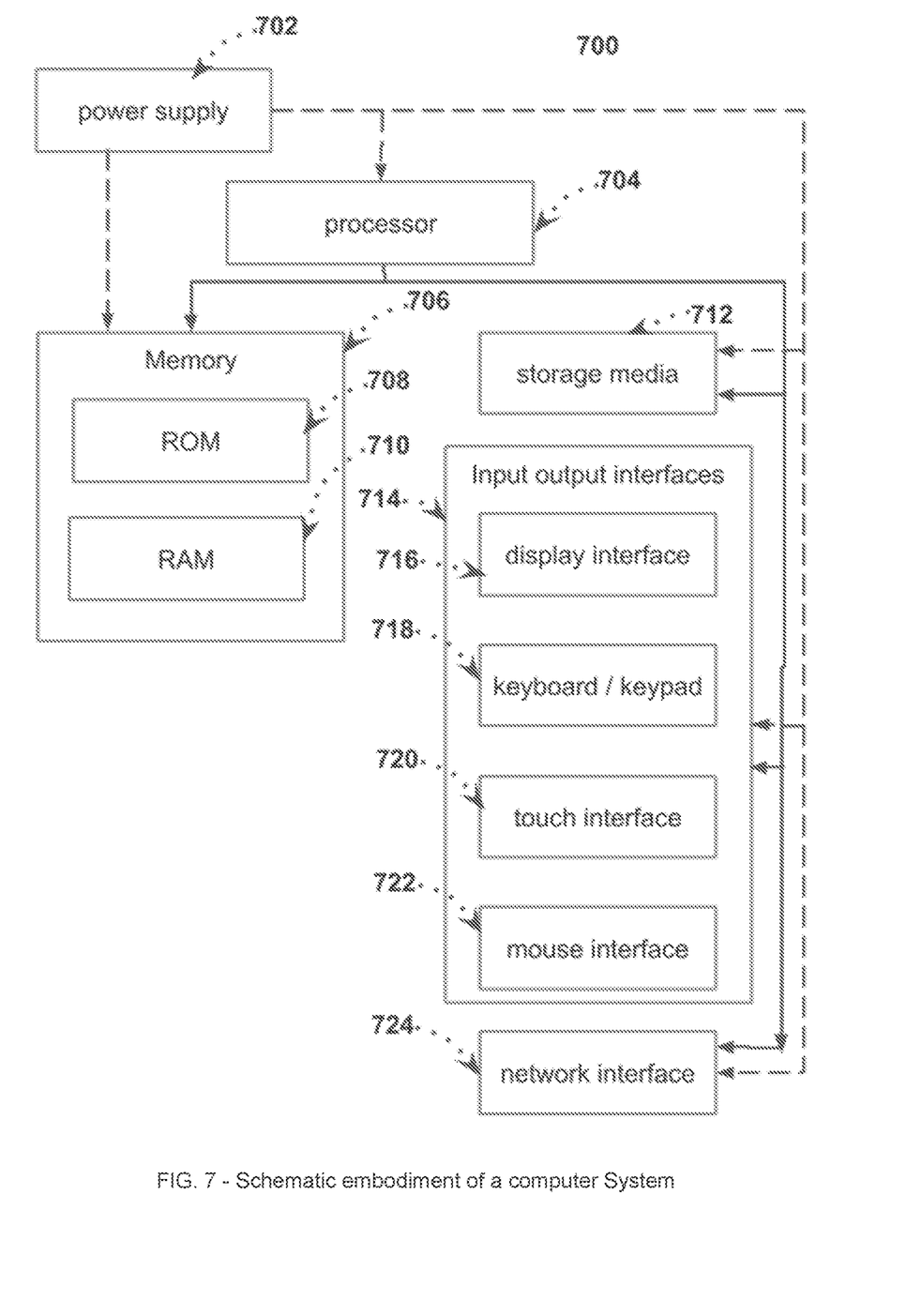
FIG. 7 illustrates a schematic embodiment of a computer system

FIG. 7 illustrates a schematic embodiment of a computer system 700 that may be included in a system in accordance with at least one of the various embodiments. Computer System 700 may include many more or less components than those shown in FIG. 7. However, the components shown are sufficient to disclose an illustrative embodiment for practicing the present invention. Computer system 700 may represent, for example, one embodiment of a least one of computer systems 602 to 612 of FIG. 8.

As shown in the figure, computer system 700 includes a processor device 704, power supply 702, the memory 706, storage media 712, input output interfaces 714, network interface 724, and the subsystems in each of the above.

The power supply 702 provides power to the processor device 704, the memory 706, storage media 712, input output interfaces 714, network interface 724, and the subsystems in each of the above. A rechargeable or non-rechargeable battery may be used to provide power. The power may also be provided by an external power source, alternating current adaptor or a powered adaptor that recharges or works as an alternative to a battery.

The memory 706 includes read only memory ROM 708 and random-access memory RAM 710. The memory 706 may be included in a system in accordance with at least one of the various embodiments. This may include many more or less components than those shown in memory 706. The ROM 708 may be used to store information such as, computer readable instructions, applications, data, program modules, or other likes. The RAM 710 may be used to store information such as, computer readable instructions, applications, data, program modules, or other likes.

The storage media 712 includes one or many of random access memory, read only memory, hard disk drive, solid state disk drive, Electrically Erasable Programmable Read-only Memory, flash memory, compact-Disk read-only memory (CD-ROM), digital versatile disk (DVD), optical storage media, magnetic storage media, or the likes. Storage media 712 illustrates an example of computer readable storage media for storage of information such as computer readable instructions, data structures, program modules or other data. The storage media 712 stores a basic input output system BIOS or the like, for controlling low-level operation of computer systems. The storage media 712 also stores an operating system for controlling the operation of computer systems. Operating systems include and not limited to UNIX, Linux, Microsoft corporation's windows OS, Apple corporation's iOS, google corporation's Android, google corporation's chrome OS, Apple corporation's macOS. The operating system may include, or interface with a java virtual machine module that enables control of hardware components and or operating system operations via java application programs. Storage media 712 further includes data storage, which can be utilized by computer systems to store applications, and/or other data.

The input output interfaces 714 includes display interface 716, keyboard/keypad 718, touch interface 720, and mouse interface 722. The input output interface 714 may be included in a system in accordance with at least one of the various embodiments. This may include many more or less components than those shown in the figure.

The display interface 716 connects the computer system to a display device. Display device includes but not limited to, liquid crystal display (LCD), gas plasma, light emitting diode (LED), or any other type of display used with a computer. In some embodiments, display interface 716 may be optional.

The keyboard/keypad 718 is an interface that connects the computer system to a keyboard or to a keypad. The keyboard includes, but not limited to, a push button layout device or a touchscreen layout device. The keypad includes, but not limited to, a push button layout device or a touchscreen layout device. In some embodiments, keyboard/keypad 718 may be optional.

The touch interface 720 connects the computer system to a touch screen or a trackpad. The touch screen includes, but is not limited to, resistive touch screen or capacitive touchscreen. The trackpad includes, but is not limited to, touchpad or a pointing stick. In some embodiments, touch interface 720 may be optional.

The mouse interface 722 connects the computer system to a mouse. The mouse includes but not limited to, trackball mouse and optical mouse. In some embodiments, mouse interface 722 may be optional.

The network interface 724 includes circuitry for coupling a computer system to one or more other computer systems. The network interface 724 connects the computer system with one or more communication protocols and technologies including, but not limited to, GSM, GPRS, EDGE, HSDPA, LTE, CDMA, WCDMA, UDP, TCP/IP, SMS, WAP, UWB, WiMAX, SIP/RTP, or any of a variety of other communication protocols. Network interface 724 may be present, in which case, two or more compute systems may work together to practice the present invention. Network interface 724 may not be present, in which case, a standalone computer system works to practice the present invention. In some embodiments, network interface 724 may be optional.

Generalised Operations

Figure 2:
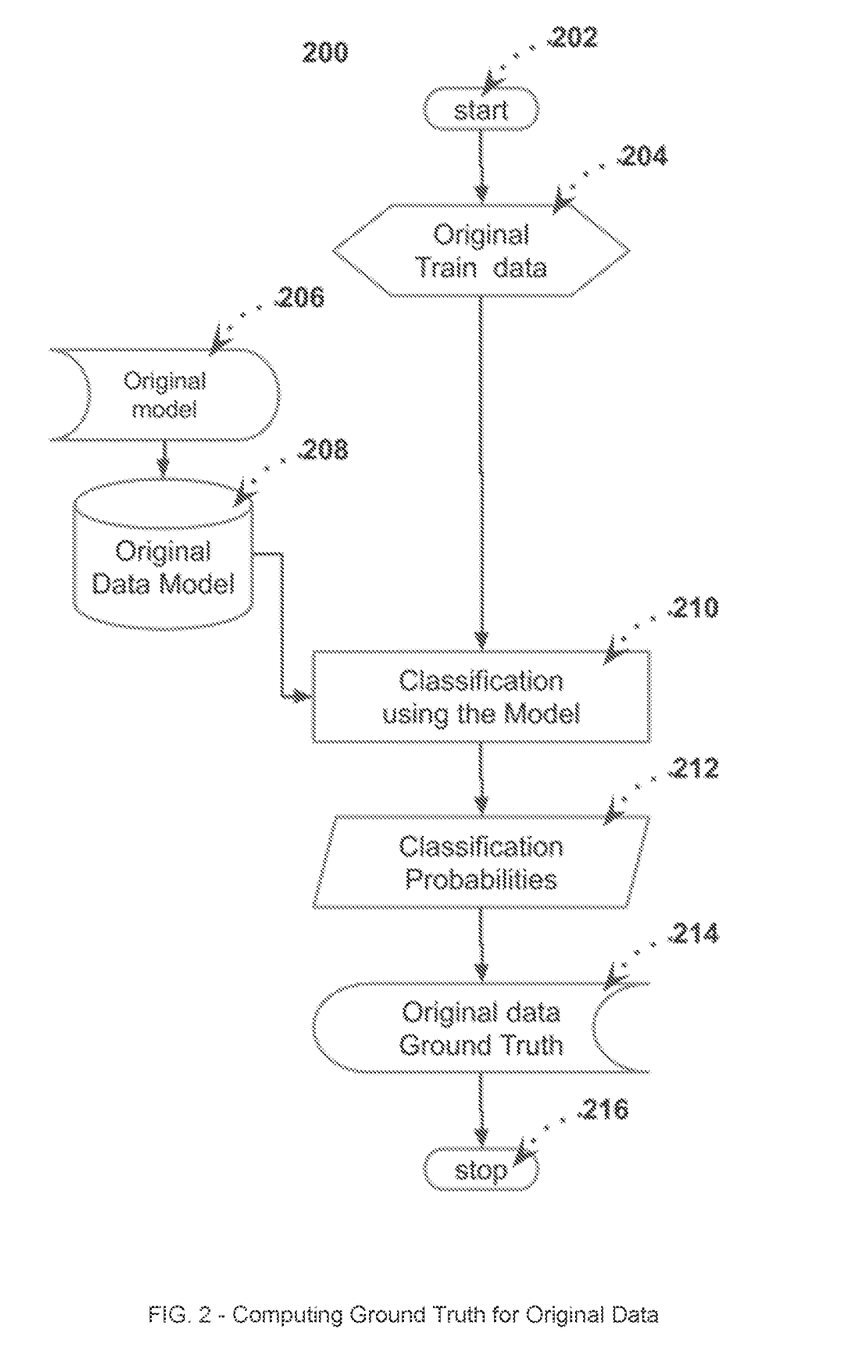
FIG. 2 illustrates a flow chart of a process for computing ground truth for original data
Figure 3:
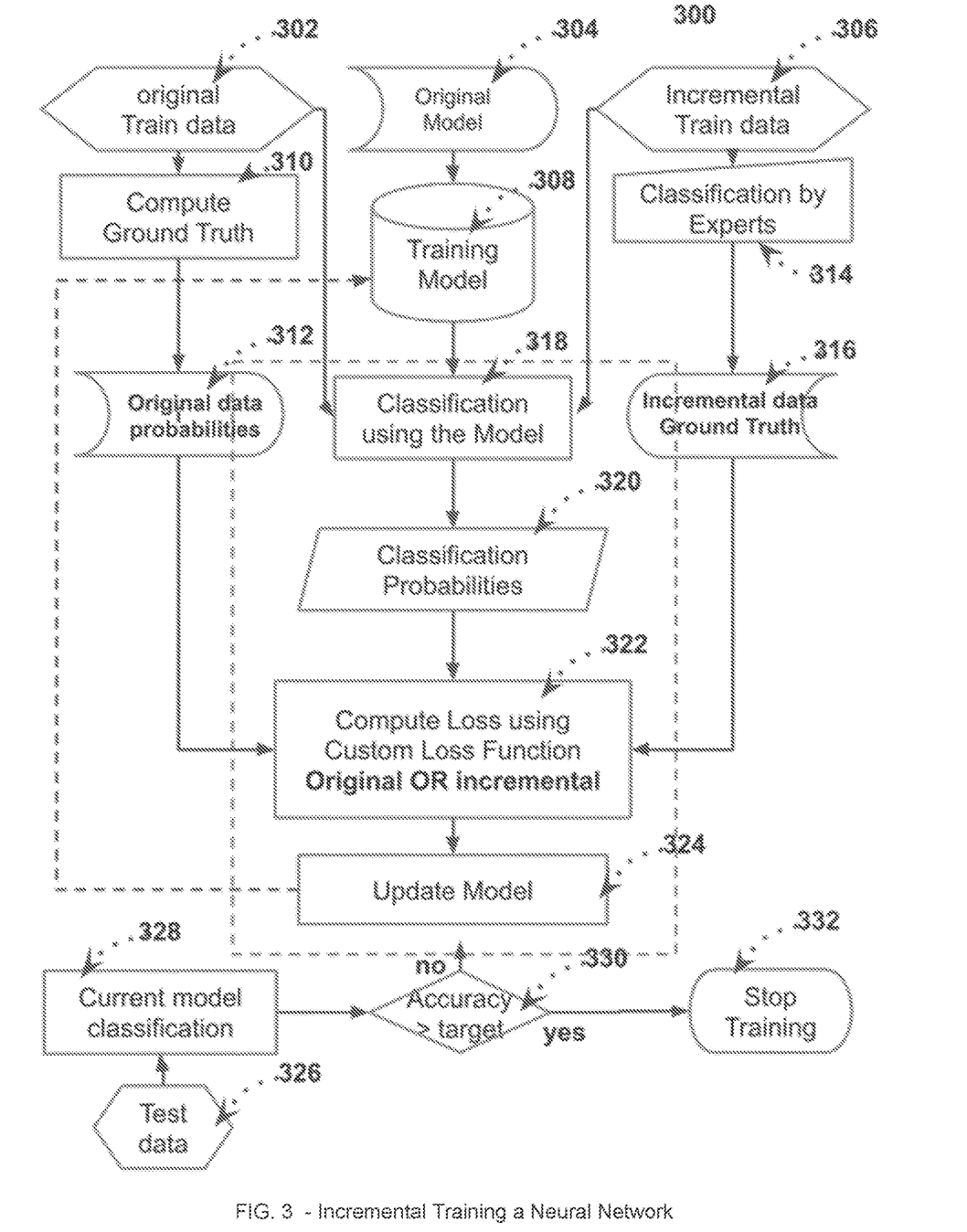
FIG. 3 illustrates a flow chart of a process for incremental training a neural network

The proposed system for "incremental training" is detailed using FIG. 2 and FIG. 3.

The incremental training is started with
an original data set 204 and 302,
an original model 206 and 304
an incremental data set 308
a test data 326

The original data set 204 and 302 includes and not limited to, numbers, vectors, sensor data, raw images, pictures, and videos.

The types of the original model 206 and 304 includes and not limited to, neural networks, deep neural networks, recurrent neural networks, convolutional neural networks, region convolutional neural networks, fast region convolutional neural networks, faster region convolutional neural networks.

The original model 206 and 304 includes and not limited to, resnet, alexnet, VGG, lenet, inception and ir2.

The incremental data set 306 includes and not limited to, numbers, vectors, sensor data, raw images, pictures, and videos added to the original data set 204 and 302.

The test data set 120 and 326 includes and not limited to, numbers, vectors, sensor data, raw images, pictures, and videos similar to the original data set 204.

The first step is to compute the "pre-training data ground truth" as described in the process 200. The process is started with original train data 204. The original train data 204 consists of a number of data points. The original model 206 is loaded to the original data model 208. The original model consists of multidimensional arrays with graph representation of the data model 208 and the weights associated with the data model 208. For each of the data points in the original dataset 204, the classification using the model 210 is computed to predict classification probabilities 212. The classification using the model 210 takes one data point from the original train data 204. Then, it passes the data through the original data model 208. The output of the model is the classification probability of that data point. For all the data points in the original data model 208, the classification probabilities 212 is computed. The classification probabilities 212 are stored as the original data ground truth 214. The objective of this process is to set the pre-trained data ground truth for each of the original dataset. The ground truth is the expected output of a data model for an input data point. Normally, for a given data point, the ground truth is originally assigned by classification by experts 104. But in process 200, the ground truth is not the expected output of the data model as per classification by experts. Instead, the actual output value of the original data mode 208. The significance of this is explained below. In training a neural network, difference between expert assigned ground truth and model computed classification probabilities is used to train the neural network model in successive iterations or epochs. In this process 200 computing ground truth for original data, the model computed classification probabilities are taken as the ground truth instead of an expert assigned ground truth. Thus, the difference between ground truth and the classification probabilities is 0. In this case, any further training using this dataset will not affect the weights of the neural network model as the updates on the weights will be 0.

The pseudo code is as given below.
Input original data set 204 consisting of n data points
Input the original data model 206 and assign to model 208
For each of the data point in the original dataset 204
apply the data model 208 to current data point
compute the output classification probability
assign that to the current data point as ground truth
Combine all the ground truth into original data ground truth 214.

The second step is the incremental training as described in the process 300.

The original train data 302 is used in the process 200 to compute ground truth 310 and produce original data probabilities 312. This process is detailed in the process 200. The original train data 302 is the input for the process 200. The compute ground truth 310 is the process 200. The output of the process 200 is the original data probabilities 312.

The original model 304 is loaded to the training model 308. The original model 304 is the same as the original data model 208. The model consists of multidimensional arrays with graph representation of the original model 304 and the weights associated with the original model 304.

The incremental data 306 is classified by experts 314 into classes. Using such classification, the incremental data ground truth 316 is calculated. The incremental data 306 is one or many data points. The data points in incremental data 306 are similar to the data points described in original data 204. Each of these data points is classified by experts 314 into an expected output. This classification by experts of all the data points together is the output incremental data ground truth 316.

The training data is the combined data set of original data 302 and incremental train data 306. This combined data set is the input to the classification using the model 318. In a normal implementation, the combined training data is split into batches and each data point is passed on to the next steps along with the information on whether it is from the original data or from the incremental data. But, in some implementations, the entire combined training data is passed to the next steps. And in some other implementations, data points from combined training data is passed one by one to the next steps.

The training model 308 is used by the "classification using the model" 318, to predict "classification probabilities" 320 for a data point. The classification using the model 318 takes one data point from the combined data from original train data 302 and incremental train data 306. Then, it passes the data through the train model 308. The output of the model is the classification probability of that data point. For all the data points in the combined data 208, the classification probabilities 320 is computed. Thus, a data point in the combined data 208 has two classification values. First is the classification probability 320 computed using the training model 308. Second is based on whether the data point is from original train data 302 or from the incremental train data 306. If the data point is from the original train data 302, then the second classification value is the original data probabilities 312. If the data point is from the incremental train data 306, then the second classification is the which is the incremental data ground truth 316. The classification probability of a data point 320 is compared with the ground truth of that data point and a loss is computed using a custom loss function 322. In this step, the data points from the original data 302 use the original data probabilities 312, whereas the data points from the incremental data 306 use the incremental data ground truth. The custom loss function does the following. First the data point is checked if it is from the original train data 302 or from the incremental train data 306. (a) if it is from the original train data 302, then the classification probability 320 is subtracted from the original data probability of 312 of that data points to arrive at the loss for the current data point. (b) if it is from the incremental train data 306, then the classification probability 320 is subtracted from the incremental data ground truth 316 of that data point. Thus, loss for each of the data points is computed.

The result of loss function is used to update the training model 308. A batch of data points is used in the steps 318, 320, and 322. At the end of that batch, the training model 308 is updated in step 324 for the entire batch. Such training process includes, but not limited to backpropagation, Gradient descent, Newton method, Conjugate gradient, Quasi-Newton method, and Levenberg-Marquardt algorithm.

The steps 318, 320, 322, and 324 are run iteratively to update the training model 308 for all data points in the combined dataset of original data 302 and incremental train data 306. This is run iteratively multiple times over the entire combined dataset. One run or few runs across the entire dataset is an epoch.

At regular intervals between epochs, the current version of the training model 308 is used to compute the classification accuracy 328 of the test data 326. The test data 326 consists of one or many data points. It is noted that the test data 326 is also classified by experts and a ground truth is associated with that. Using the ground truth associated with test data 326 and the current training model 308, classification accuracy of the current model 328 is computed. The current model classification 328 takes one data point from the test data 204. Then, it passes the data through the training model 308. The output of the model is the classification probability of that data point. For all the data points in the test data 326, the output classification probabilities are computed. The output classification probability for each data point is compared with the ground truth of that datapoint. If it matches, then the data point is classified successfully. If it does not match, then the date point classification has failed. This successful or failed classification for all the datapoints is used to compute an accuracy. Formula to compute accuracy includes and not limited to, successful classification divided by the total data-points. The accuracy is compared with target accuracy 330. The target accuracy is set for the training. If the current model accuracy is not greater than the target accuracy, then the training iterations are continued by steps 318, 320, 322, and 324. The training continues till the current model accuracy is greater than the target accuracy, and then the training is stopped 332. At the end of the incremental training 300, a training model 308 is saved.

The pseudo code in one embodiment is as follows:

```
input original train data 302 consisting of n data points
input the original data model 304 and assign to training model 308
For each of the data point in the original train data 302
    compute the classification probability using model 308
    assign that to the current data point as ground truth
Combine all the ground truth into original data probabilities 312
input incremental train data 306
input test data 326
for each of the datapoint in the incremental train data 306
    classify the current datapoint by experts
    assign the classification as the ground truth for the datapoint
        Combine all the classification by expert to
        incremental data ground truth 316.
        for batch of the data point in combined (a)
        original train data 302 and (b) incremental train
        data 306
            compute the classification using the
            model 318
            compute the loss function 322
            use the loss function to update model 324
            the updated model is assigned to training
            model 308
            If a batch is completed
                for each of the datapoint in test
                data 326
                    compute the classification
                    probability of the current data
                    point with model 308
                    use the computed probability
                    to classify the current datapoint
                        compare classification with
                    ground-truth
                        Find if the data point is
                    classified successfully
                        count the successfully
                    classified data points
                Compute the accuracy for the test
            data
                compare the computed accuracy with
            target accuracy 330
                if the computed accuracy is greater
            than
                the target accuracy,
```

```
        then,
            break and stop training
        else,
            continue to the next batch of
            the training.
```

The Incremental training can be explained using the illustrations in FIG. 5 a, b, and c.

FIG. 5a illustrates the classes in the pre-trained model 304.

FIG. 5b Illustrates a case when the model is retrained from scratch using the original and incremental data, and the classification boundaries are completely redrawn.

FIG. 5c illustrates the classes in the output model of incremental training 300. The new set of incremental train data is shown as encircled data points. The classification boundaries are not entirely redrawn in incremental training but adjusted to include the new data points in incremental data.

What is claimed is:

1. A method comprising:
    determining via a processor an initial trained neural network based on initial training data that includes a plurality of training data observations, each of the training data observations including a respective plurality of initial training data feature values and a respective initial training data observed outcome value;
    determining via the processor a plurality of initial training data predicted outcome values by applying the initial trained neural network to the initial training data feature values;
    determining via the processor an updated trained neural network based on updated training data, the updated training data including a first portion including incremental training data not included in the initial training data, the updated training data including a second portion including the plurality of initial training data feature values and the plurality of initial training predicted outcome values;
    determining via the processor one or more live data predicted outcome values by applying the updated trained neural network to live data; and
    storing the live data predicted outcome values on a storage device.

2. The method recited in claim 1, the method further comprising initializing the updated trained neural network based on the initial trained neural network.

3. The method recited in claim 1, wherein determining the plurality of initial training data predicted outcome values includes determining a plurality of classification probabilities.

4. The method recited in claim 3, wherein the initial training data predicted outcome values including the plurality of classification probabilities.

5. The method recited in claim 3, wherein the initial training data predicted outcome values included target classes determined based on the plurality of classification probabilities.

6. The method recited in claim 1, the method further comprising computing a custom loss function.

7. The method recited in claim 6, wherein the updated trained neural network is determined at least in part based on the custom loss function.

8. The method recited in claim 1, wherein the updated trained neural network includes a model selected from the group consisting of: a neural network model, a convolutional neural network model, a deep learning neural network model, a recurrent neural network model, a long short-term memory (LTSM) neural network model, a gated recurrent units (GRU) neural network model, a generative adversary model, and an auto encoder model.

9. One or more non-transitory computer readable media having instructions stored thereon for performing a method, the method comprising:
    determining via a processor an initial trained neural network based on initial training data that includes a plurality of training data observations, each of the training data observations including a respective plurality of initial training data feature values and a respective initial training data observed outcome value;
    determining via the processor a plurality of initial training data predicted outcome values by applying the initial trained neural network to the initial training data feature values;
    determining via the processor an updated trained neural network based on updated training data, the updated training data including a first portion including incremental training data not included in the initial training data, the updated training data including a second portion including the plurality of initial training data feature values and the plurality of initial training predicted outcome values;
    determining via the processor one or more live data predicted outcome values by applying the updated trained neural network to live data; and
    storing the live data predicted outcome values on a storage device.

10. The one or more non-transitory computer readable media recited in claim 9, the method further comprising initializing the updated trained neural network based on the initial trained neural network.

11. The one or more non-transitory computer readable media recited in claim 9, wherein determining the plurality of initial training data predicted outcome values includes determining a plurality of classification probabilities.

12. The one or more non-transitory computer readable media recited in claim 11, wherein the initial training data predicted outcome values including the plurality of classification probabilities.

13. The one or more non-transitory computer readable media recited in claim 11, wherein the initial training data predicted outcome values included target classes determined based on the plurality of classification probabilities.

14. The one or more non-transitory computer readable media recited in claim 9, the method further comprising computing a custom loss function.

15. The one or more non-transitory computer readable media recited in claim 14, wherein the updated trained neural network is determined at least in part based on the custom loss function.

16. The one or more non-transitory computer readable media recited in claim 9, wherein the updated trained neural network includes a model selected from the group consisting of: a neural network model, a convolutional neural network model, a deep learning neural network model, a recurrent neural network model, a long short-term memory (LTSM) neural network model, a gated recurrent units (GRU) neural network model, a generative adversary model, and an auto encoder model.

17. A system including a processor, memory, and a storage device, the system configured to perform a method comprising:

determining via the processor an initial trained neural network based on initial training data that includes a plurality of training data observations, each of the training data observations including a respective plurality of initial training data feature values and a respective initial training data observed outcome value;

determining via the processor a plurality of initial training data predicted outcome values by applying the initial trained neural network to the initial training data feature values;

determining via the processor an updated trained neural network based on updated training data, the updated training data including a first portion including incremental training data not included in the initial training data, the updated training data including a second portion including the plurality of initial training data feature values and the plurality of initial training predicted outcome values;

determining via the processor one or more live data predicted outcome values by applying the updated trained neural network to live data; and storing the live data predicted outcome values on the storage device.

18. The system recited in claim 17, the method further comprising initializing the updated trained neural network based on the initial trained neural network.

19. The system recited in claim 17, wherein determining the plurality of initial training data predicted outcome values includes determining a plurality of classification probabilities.

20. The system recited in claim 17, the method further comprising computing a custom loss function, wherein the updated trained neural network is determined at least in part based on the custom loss function.

* * * * *